United States Patent
Hilker et al.

(10) Patent No.: US 11,742,783 B2
(45) Date of Patent: Aug. 29, 2023

(54) MOTOR APPARATUS FOR A SWITCH DRIVE OF AN ELECTRICAL SWITCH

(71) Applicant: Siemens Energy Global GmbH & Co. KG, Munich (DE)

(72) Inventors: Thomas Hilker, Stahnsdorf (DE); Lutz-Ruediger Jaenicke, Mahlow (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 120 days.

(21) Appl. No.: 17/413,643

(22) PCT Filed: Nov. 15, 2019

(86) PCT No.: PCT/EP2019/081485
§ 371 (c)(1),
(2) Date: Jun. 14, 2021

(87) PCT Pub. No.: WO2020/120069
PCT Pub. Date: Jun. 18, 2020

(65) Prior Publication Data
US 2022/0077804 A1    Mar. 10, 2022

(30) Foreign Application Priority Data
Dec. 13, 2018 (DE) .......................... 102018221667.3

(51) Int. Cl.
*H02P 27/04* (2016.01)
*H02P 23/14* (2006.01)

(52) U.S. Cl.
CPC .............. *H02P 27/04* (2013.01); *H02P 23/14* (2013.01)

(58) Field of Classification Search
CPC . H02P 27/04; H02P 23/14; H02P 7/06; H01H 3/26; H01H 3/3005
(Continued)

(56) References Cited

U.S. PATENT DOCUMENTS 5,714,816 A    2/1998  Jensen et al.
5,982,136 A *  11/1999 Pelly ..................... H02M 5/458
                                                          318/801
(Continued)

FOREIGN PATENT DOCUMENTS

DE          19511114 C1    8/1996
DE      102016210466 A1   12/2017
(Continued)

*Primary Examiner* — David Luo
(74) *Attorney, Agent, or Firm* — Laurence A. Greenberg; Werner H. Stemer; Ralph E. Locher

(57) ABSTRACT

A motor apparatus for a switch drive of an electric switch has an electric motor and a control apparatus for controlling the electric motor. The control apparatus has a power supply device for the electrical power supply of the electric motor. The electric power supply has a rectifier unit, a voltage measurement unit for detecting the supply voltage or a rectifier output voltage of the rectifier unit, a switch unit for generating a drive voltage for the electric motor from the supply voltage or from the rectifier output voltage, and a control unit for controlling the switch unit as a function of the supply or rectifier output voltage detected. Accordingly, the motor apparatus has a motor housing which, besides the electric motor, houses part of the power supply device and/or at least part of the control unit.

9 Claims, 1 Drawing Sheet

(58) Field of Classification Search
USPC .................................................. 318/503, 494
See application file for complete search history.

(56) References Cited

U.S. PATENT DOCUMENTS

| | | | |
|---|---|---|---|
| 8,947,899 B2* | 2/2015 | Savatski | ............... H02M 7/003 |
| | | | 174/68.2 |
| 10,411,619 B2* | 9/2019 | Li | ........................... H02P 29/50 |
| 10,491,079 B2 | 11/2019 | Jugovic et al. | |
| 10,861,656 B2 | 12/2020 | Hilker | |
| 2019/0237274 A1 | 8/2019 | Hilker | |

FOREIGN PATENT DOCUMENTS

| | | |
|---|---|---|
| DE | 102016218334 A1 | 3/2018 |
| DE | 102018215756 A1 | 3/2020 |
| EP | 0720193 A1 | 7/1996 |
| EP | 3258579 A1 | 12/2017 |
| EP | 3491655 B1 | 8/2020 |
| WO | WO 2018054672 A1 | 3/2018 |
| WO | WO 2018205101 A1 | 11/2018 |

* cited by examiner

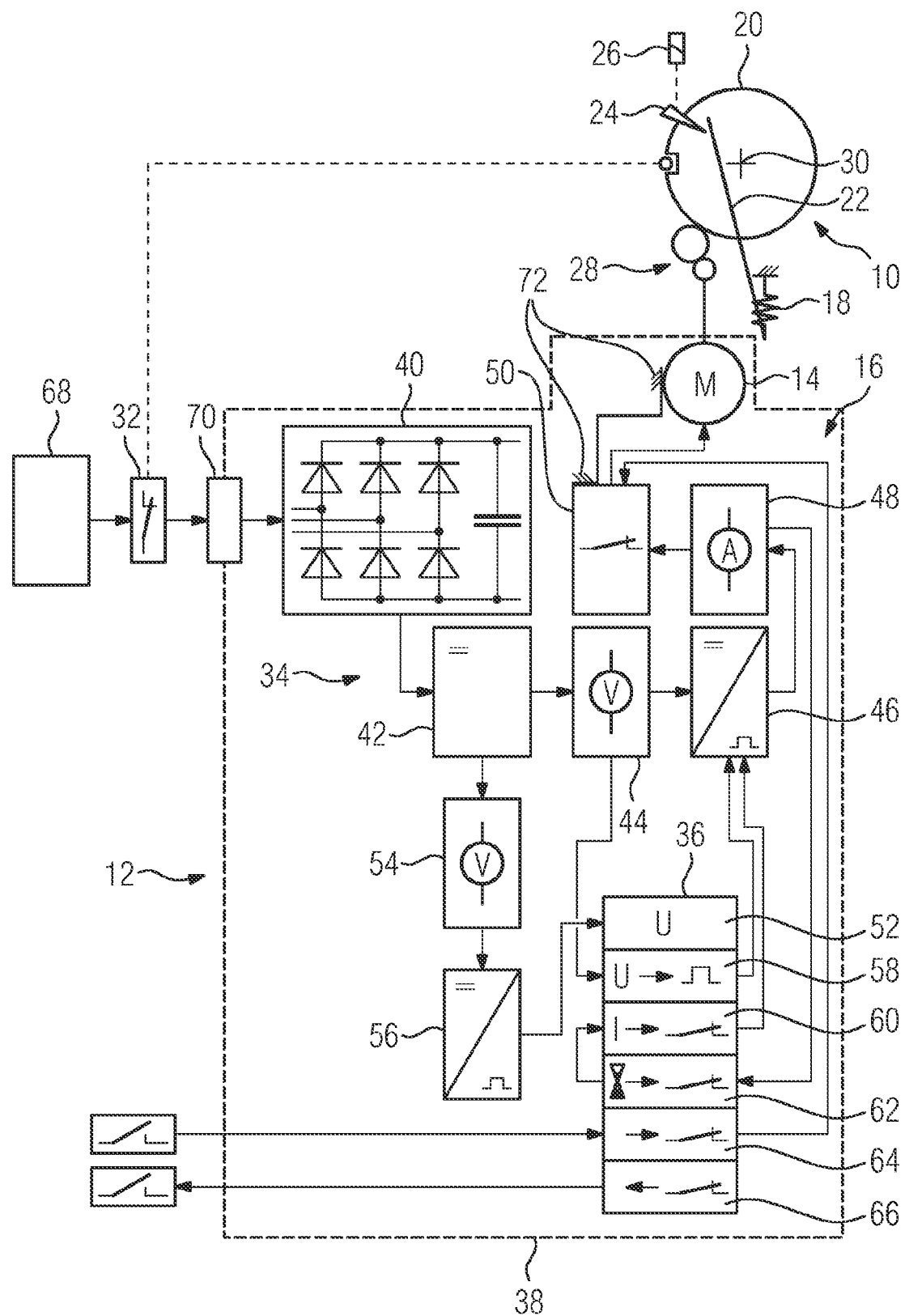

MOTOR APPARATUS FOR A SWITCH DRIVE OF AN ELECTRICAL SWITCH

BACKGROUND OF THE INVENTION

Field of the Invention

The invention relates to a motor apparatus for a switch drive of an electrical switch, having an electric motor and a control apparatus for controlling the electric motor, wherein the control apparatus has
an energy supply device for supplying electrical energy to the electric motor, having
  a rectifier unit,
  a voltage measuring unit for capturing the supply voltage or a rectifier output voltage of the rectifier unit and
  a switching unit for generating a drive voltage for the electric motor from the supply voltage or from the rectifier output voltage and
a control unit for driving the switching unit depending on the captured supply or rectifier output voltage.

Electrical switches for closing or opening current paths of medium and high electrical voltages and currents need a large amount of mechanical energy to move switching contacts of the switches.

For example, switch drives, which store mechanical energy, for example stored-energy spring mechanisms, are often used to move the switching contacts of circuit breakers. In a stored-energy spring mechanism, a spring, for example a helical spring, is often tensioned by means of an electric motor via a gear mechanism. The spring is locked against independent relaxation, with the result that the energy remains stored in the spring. A triggering apparatus can release the stored energy by releasing the locking of the spring, with the result that the spring relaxes. A switching action can therefore be carried out using the available stored energy.

Unlike circuit breakers, isolating switches cause a defined interruption of approximately load-free electrical circuits by driving switching contacts directly, for example by a motor. In this case, storage of energy is dispensed with since load-free (powerless) isolation of the switching contacts can be carried out more slowly.

The electrical supply voltages of electric motors for switch drives of electrical switches are diverse on account of normative specifications and application requirements and, in addition to the voltage level, also differ in terms of the type of voltage, which may be, for example, a single-phase or three-phase AC voltage or a DC voltage. Therefore, different motor types and designs are used for switch drives of electrical switches. Control, protection, locking and monitoring functions for the motors are implemented by means of a multiplicity of component and wiring variants. The component and wiring variance increases the costs and the error rate involved in installing the motors.

The document DE 10 2016 218 334 A1 discloses a motor apparatus for a switch drive of an electrical switch described above. The motor apparatus comprises a brushless electric motor and an electronic control apparatus for controlling the electric motor; the control apparatus in turn comprises: (i) a rectifier unit for rectifying a supply voltage of the motor apparatus if the supply voltage is an AC voltage and for polarity reversal protection if the supply voltage is a DC voltage, (ii) a voltage measuring unit for capturing a rectifier output voltage of the rectifier unit, (iii) a switching unit for generating a pulse-width-modulated AC drive voltage for the electric motor from the rectifier output voltage of the rectifier unit, and (iv) a control unit for controlling the switching unit on the basis of the captured rectifier output voltage.

SUMMARY OF THE INVENTION

The invention is based on the object of specifying a motor apparatus for a switch drive of an electrical switch that is compact and able to be handled easily.

The object is achieved according to the invention by the features of the independent claim.

The subclaims relate to advantageous configurations of the invention.

In the motor apparatus according to the invention for a switch drive of an electrical switch, which comprises an electric motor and a control apparatus for controlling the electric motor, in which said control apparatus in turn has an energy supply device for supplying electrical energy to the electric motor, having (a) a rectifier unit, (b) a voltage measuring unit for capturing the supply voltage or a rectifier output voltage of the rectifier unit and (c) a switching unit for generating a drive voltage for the electric motor from the supply voltage or from the rectifier output voltage, and a control unit for controlling the switching unit depending on the captured supply or rectifier output voltage, it is provided that said motor apparatus furthermore has a motor housing, which in addition to the electric motor houses at least a part of the energy supply device and/or at least a part of the control unit. The result is a compact design in which at least some of the component parts are combined to form one module and are housed together per motor housing. In this case, both the electric motor as well as the energy supply device and control device are preferably housed by the motor housing. The electric motor can be both a DC motor and an AC motor such as a three-phase motor. The alternatives in the design of the energy supply device mentioned here relate in particular to a DC motor. The energy supply device is a type of power supply for the electric motor.

Such a motor apparatus can be advantageously operated with different supply voltages, in which case the supply voltages may differ in terms of their amplitude and/or type of voltage. The rectifier unit enables selective operation with a single-phase or multiphase AC supply voltage and a DC supply voltage of any polarity by virtue of it rectifying an AC supply voltage and providing polarity reversal protection for a DC supply voltage. The practice of generating a DC drive voltage for the electric motor from the predefined supply voltage makes it possible to adapt the DC drive voltage for the electric motor to the respective supply voltage and to the requirements of the components to be driven. This achieves extensive independence of the motor apparatus from the amplitude and type of the supply voltage and from the components to be driven, with the result that the motor apparatus can be used for switch drives of different electrical switches, for example for tensioning springs of the stored-energy spring mechanisms of circuit breakers or for directly driving switching contacts of isolating switches. In particular, it is possible to advantageously reduce the number of motor variants for different switches. Instead of different electric motors, an electric motor that can be operated with direct current is used for different switches. The invention also advantageously reduces the modification effort when subsequently adapting the supply voltage. In terms of production, the installation and wiring of different electrical components for monitoring and controlling the electric motor are dispensed with, in particular.

The associated standardization also reduces an error probability during these production processes.

According to a preferred embodiment of the invention, the energy supply device is an energy supply device for supplying electrical energy to the electric motor and to the control unit. In other words, the energy supply device is a type of power supply for the electric motor and the control unit.

According to another preferred embodiment of the invention, the energy supply device for supplying electrical energy to the control unit has a further voltage measuring unit for capturing the supply voltage or a rectifier output voltage of the rectifier unit, and a further switching unit for generating a supply voltage for the control unit from the supply voltage or from the rectifier output voltage.

In particular, it is provided that the switching unit and/or the further switching unit is connected downstream of the rectifier unit. The rectifier unit and switching unit are separate and an intermediate circuit is produced between the two units. The voltage measuring unit in this case captures the rectifier output voltage of the rectifier unit.

As an alternative, the rectifier unit comprises the switching unit. The rectifying and switching function are performed in one unit, the rectifier unit. The voltage measuring unit in this case accordingly captures the supply voltage.

In this case, the switching unit is preferably in the form of a simplified buck converter or comprises a simplified buck converter. The buck converter, also called a step-down converter, is a relatively simple form of a switching DC-DC converter. The output voltage of the buck converter is always lower than the absolute value of the input voltage of the buck converter.

According to yet another preferred embodiment of the invention, the control apparatus has a current measuring unit for capturing a motor current flowing between the switching unit and the electric motor. This configuration of the invention advantageously makes it possible to monitor the motor current in order to detect overloads and malfunctions of the electric motor.

One configuration of the invention provides for the control apparatus to have a DC isolating unit for the DC isolation of the electric motor from the rest of the control apparatus. For example, the DC isolating unit has a relay or a contactor for the DC isolation of the electric motor from the control apparatus. This configuration of the invention advantageously makes it possible to safely switch off the electric motor if an overload or malfunction is detected.

Another configuration of the invention provides for at least one of the power-transmitting electrical components of the control apparatus, in particular the DC isolating unit, to be connected in a thermally conductive manner to a component part of the electric motor and/or a component part of the motor housing. In this way, the heat is dissipated directly from the interior of the housing or the corresponding component part is used as a cooling element.

Another configuration of the invention provides for the control unit to have an input assembly, by means of which input signals of at least one external device can be supplied or are supplied to the control unit. In particular, input signals of a limit switch for capturing an end position of the switch drive are supplied to the control unit by means of the input assembly. This configuration of the invention advantageously makes it possible to process input signals relevant to the operation of the respective switch using the control unit. For example, the control apparatus can thereby react to input signals such as locking requests for locking the switch drive and can disconnect the electric motor if necessary. Input signals from a limit switch for capturing an end position of the switch drive with respect to the switching unit make it possible, in particular, to monitor an end position of the switch drive using the control unit.

Another configuration of the invention provides for the control unit to have an output assembly, by means of which output signals are output to at least one external device by the control unit. This configuration of the invention advantageously makes it possible to output a state of the electric motor and/or of the control apparatus using the output signals and to further process the same in other assemblies, for example in conventional electrical control components.

The above-described properties, features and advantages of this invention and the manner in which they are achieved become clearer and more distinctly comprehensible in connection with the following description of an exemplary embodiment, which is explained in more detail in connection with the drawing, in which:

BRIEF DESCRIPTION OF THE DRAWING

FIG. 1 shows a block diagram of a switch drive of an electrical switch and a motor apparatus according to an embodiment of the invention.

DETAILED DESCRIPTION OF THE INVENTION

FIG. 1 shows a block diagram of a switch drive 10 of an electrical switch and a motor apparatus 12 for said switch drive 10. The motor apparatus 12 has an electric motor 14 and an electronic control apparatus 16 for controlling said electric motor 14. In the example shown, the switch drive 10 is a stored-energy spring mechanism and has a spring 18, a tensioning wheel 20, a coupling element 22 connecting the spring 18 to the tensioning wheel 20, a locking unit 24 and a triggering unit 26. The electric motor 14 may be a DC or AC motor. For the sake of simplicity, it is referred to as an electric motor 14 for short below.

The electric motor 14 is coupled to the tensioning wheel 20 by means of a gear mechanism 28 in order to rotate the tensioning wheel 20 about an axis of rotation 30 in a first direction of rotation from a first end position into a second end position. The coupling element 22 is in the form of a coupling rod, which is connected to the tensioning wheel 20 at one end and is connected to the spring 18 at the other end, with the result that the spring 18 is tensioned by rotating the tensioning wheel 20 about the axis of rotation 30 in the first direction of rotation.

The spring 18 can therefore be tensioned by the electric motor 14. The tensioning wheel 20 can be locked by the locking unit 24, with the result that rotation of the tensioning wheel 20 is blocked in order to prevent relaxation of the spring 18. For example, the locking unit 24 has, for this purpose, a locking armature, which arrests the tensioning wheel 20 and/or the coupling element 22 in the second end position in which the spring 18 is tensioned.

The locking of the tensioning wheel 20 can be canceled by the triggering unit 26 in order to enable relaxation of the spring 18. As a result of the relaxation of the spring 18, the tensioning wheel 20 is rotated from the second end position into the first end position and a switching contact (not illustrated) of the switch is moved in order to interrupt a current path. The end positions of the tensioning wheel 20 are captured by a limit switch 32.

The control apparatus 16 has an energy supply device 34 in the form of a power supply and a corresponding control unit 36. The electric motor 14, the energy supply device 34 and the control unit 36 are housed together in a motor housing 38. To supply energy to the electric motor, the energy supply device 34 has a rectifier unit 40, an intermediate circuit 42 connected downstream of said rectifier unit 40, a voltage measuring unit 44 connected downstream of the intermediate circuit 42, a switching unit 46 connected downstream of the voltage measuring unit 44, a current measuring unit 48 connected downstream of the switching unit 46 and a DC isolating unit 50 connected downstream of the current measuring unit 48 for the DC isolation of the electric motor 14 from the control apparatus 16. The rectifier unit 40 comprises a rectifier circuit and a capacitor connected downstream of the rectifier circuit, which can be interpreted as an intermediate circuit capacitor and forms the input of the corresponding intermediate circuit 42 in which the voltage measuring unit 44 is connected. At the same time, however, the energy supply device 34 is also an energy supply device 34 for supplying electrical energy to the control unit 36 by means of the electrical connection 52 thereof. For supplying electrical energy to the control unit 36, the energy supply device 34 has a further voltage measuring unit 54, connected downstream of the intermediate circuit 42, for capturing the rectifier output voltage of the rectifier unit 40 and a further switching unit 56, connected downstream of the further voltage measuring unit 54, for generating a supply voltage for the control unit 36 from the rectifier output voltage.

The control unit 36 forms a type of ballast and has a pulse width modulation unit 58, a disconnecting unit 60, a time and current monitoring unit 62, an input assembly 64 and an output assembly 66. A microcontroller preferably forms the control unit 36 in this case.

The rectifier unit 40 is connected to a supply voltage source 68, which supplies the motor apparatus 12 with a supply voltage, via a connection 70 for the supply voltage. The supply voltage source 68 is a single-phase or multiphase AC voltage source or a DC voltage source.

The rectifier unit 40 is used to rectify the supply voltage if the supply voltage is an AC voltage and to provide polarity reversal protection if the supply voltage is a DC voltage, with the result that the rectifier unit 40 outputs a rectifier output voltage, which is a DC voltage with a predefined polarity. A polarity of a supply voltage, which is a DC voltage, or a polarity of a component of a supply voltage, which is an AC voltage, that differs from the predefined polarity is converted by the rectifier unit 40 into the predefined polarity.

The voltage measuring unit 44 is used to capture an amplitude of the rectifier output voltage at the intermediate circuit 42. The voltage measuring unit 44 is an electrical or electronic circuit for determining the voltage and has a voltage divider, for example. In this exemplary embodiment, it is connected in such a manner that it determines the amplitude of the rectifier output voltage (intermediate circuit voltage at the intermediate circuit 42).

The switching unit 46 is used to generate a pulse-width-modulated drive voltage for the electric motor 14 from the rectifier output voltage/intermediate circuit voltage. For this purpose, the switching unit 46 is controlled by means of the control unit 36 on the basis of the amplitude of the rectifier output voltage that is captured using the voltage measuring unit 44.

The current measuring unit 48 is used to capture a motor current flowing between the switching unit 46 and the electric motor 14. The current measuring unit 48 has a converter coil or a shunt resistor, for example.

The DC isolating unit 50 can be used to DC-isolate the electric motor 14 from the control apparatus 16. The isolating unit 50 has, for example, a relay or a contactor for the DC isolation of the electric motor 14 and the control apparatus 16.

The pulse width modulation unit 58 of the control unit 36 is used to generate pulse width modulation signals on the basis of the rectifier output voltage, which pulse width modulation signals are used to control the switching unit 46.

The time and current monitoring unit 62 of the control unit 36 is used to evaluate the motor current captured by the current measuring unit 48. In this case, an amplitude of the motor current and a period during which the motor current flows are determined.

The disconnecting unit 60 of the control unit 36 is used to disconnect the motor current via the switching unit 46 if the amplitude of the motor current exceeds a predefined amplitude threshold value or if the period during which the motor current flows exceeds a predefined time threshold value.

Input signals from at least one external device (with respect to the control apparatus) can be supplied to the control unit 36 via the input assembly 64 of the control unit 36. In particular, input signals from the limit switch 32 can be supplied to the control unit 36 via the input assembly 64. The DC isolating unit 50 is activated by the input assembly 64 on the basis of input signals in order to DC-isolate the electric motor 14 from the control apparatus 16.

Output signals can be output by the control unit 36 to at least one external device via the output assembly 66. A state of the electric motor 14 and/or a state of the control apparatus 16 and/or a state of the switch drive 10 is/are transmitted using an output signal, for example.

The following function and following advantages result:

Instead of separating the control unit (the ballast) 36, the energy supply device (the power supply) 34 and the electric motor 14, the electric motor 14 and at least one of the two other assemblies are combined physically and structurally in one module. The energy supply device (the power supply) 54, 56 for the control unit 36 is therefore fed from the rectifier output voltage, that is to say the intermediate circuit voltage, or replaced by an electronic circuit that provides the control unit 36 with the required voltage.

The further voltage measuring unit 54 determines the level of the intermediate circuit voltage and adjusts it to the requirements of the control unit 36 by way of the further switching unit 56 in the form of a transformer. This achieves a situation in which, when the supply voltage is switched on, it is not only the electric motor 14 that is supplied with power but also the control unit 36, which adjusts the motor supply voltage to the requirements of the electric motor 14.

The switch-on process of the motor supply voltage is carried out by the limit switch 32 in the form of a motor limit switch.

Furthermore, cooling surfaces of at least one power-transmitting electronic component, for example the DC isolating unit 50, are connected to the mechanical motor components or motor housing components 72. The mechanical component parts of the motor/motor housing 72 are therefore used as cooling elements.

This combination makes it possible to integrate all of the electronic assemblies 34, 36 of the control apparatus 16 into the motor housing 38, with the result that the connection 70 for the motor supply voltage constitutes the only remaining electrical interface of the motor apparatus 12 to the circuit breaker control system. Further possible interfaces are then purely optional.

LIST OF REFERENCE SIGNS

10 Switch drive
12 Motor apparatus
14 Electric motor
16 Control apparatus
18 Spring
20 Tensioning wheel
22 Coupling element
24 Locking unit
26 Triggering unit
28 Gear mechanism
30 Axis of rotation
32 Limit switch
34 Energy supply device (power supply)
36 Control unit
38 Motor housing
40 Rectifier unit
42 Intermediate circuit
44 Voltage measuring unit
46 Switching unit
48 Current measuring unit
50 DC isolating unit
52 Connection of the control unit
54 Further voltage measuring unit
56 Further switching unit
58 Pulse width modulation unit
60 Disconnecting unit
62 Time and current monitoring
64 Input assembly
66 Output assembly
68 Supply voltage source
70 Connection of the motor assembly
72 Component part motor/motor housing

The invention claimed is:

1. A motor apparatus for a switch drive of an electrical switch, the motor apparatus comprising:
   an electric motor;
   a controller for controlling said electric motor, said controller containing an energy supply for supplying electrical energy to said electric motor, said energy supply including:
   a rectifier;
   a voltage measurer for capturing a supply voltage or a rectifier output voltage of said rectifier;
   a switching system for generating a drive voltage for said electric motor from the supply voltage or from the rectifier output voltage;
   a supply controller for driving said switching system depending on the supply voltage or the rectifier output voltage, said supply controller having an input assembly, by means of said input assembly, input signals of at least one external device can be supplied or are supplied to said supply controller, the input signals of a limit switch for capturing an end position of the switch drive being supplied to said supply controller by means of said input assembly; and
   a motor housing, which in addition to said electric motor houses at least a part of said energy supply and/or at least a part of said supply controller.

2. The motor apparatus according to claim 1, wherein said energy supply supplies the electrical energy to said electric motor and to said supply controller.

3. The motor apparatus according to claim 2, wherein said energy supply for supplying the electrical energy to said supply controller has:
   a further voltage measurer for capturing the supply voltage or the rectifier output voltage of said rectifier; and
   a further switching system for generating a further supply voltage for said supply controller from the supply voltage or from the rectifier output voltage.

4. The motor apparatus according claim 3, wherein said switching system and/or said further switching system is connected downstream of said rectifier.

5. The motor apparatus according to claim 1, wherein said controller has a current measurer for capturing a motor current flowing between said switching system and said electric motor.

6. The motor apparatus according to claim 1, wherein said controller has a DC isolating unit for DC isolation of said electric motor from a rest of said controller.

7. The motor apparatus according to claim 6, wherein at least one of power-transmitting electrical components of said controller is connected in a thermally conductive manner to a component part of said electric motor and/or to a component part of said motor housing.

8. The motor apparatus according to claim 6, wherein said DC isolating unit is connected in a thermally conductive manner to a component part of said electric motor and/or to a component part of said motor housing.

9. The motor apparatus according to claim 1, wherein said supply controller has an output assembly, by means of which output signals are output to at least one external device by said supply controller.

* * * * *